(12) United States Patent
Hughes et al.

(10) Patent No.: US 12,293,850 B1
(45) Date of Patent: May 6, 2025

(54) CONFORMAL COATINGS FOR QUANTUM VACUUM APPLICATIONS

(71) Applicant: ColdQuanta, Inc., Boulder, CO (US)

(72) Inventors: Steven Michael Hughes, Louisville, CO (US); Calvin Cahall, Broomfield, CO (US); Maximillian Adriano Perez, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 4 days.

(21) Appl. No.: 18/212,445

(22) Filed: Jun. 21, 2023

Related U.S. Application Data

(60) Provisional application No. 63/354,788, filed on Jun. 23, 2022.

(51) Int. Cl.
*G21K 1/00* (2006.01)
*B82Y 10/00* (2011.01)

(52) U.S. Cl.
CPC .............. *G21K 1/003* (2013.01); *B82Y 10/00* (2013.01)

(58) Field of Classification Search
CPC ................................ G21K 1/003; B82Y 10/00
See application file for complete search history.

(56) References Cited

U.S. PATENT DOCUMENTS

| | | | |
|---|---|---|---|
| 2006/0216548 A1* | 9/2006 | Mao | C23C 16/402 257/E21.28 |
| 2014/0087214 A1* | 3/2014 | Amatucci | H01G 11/06 429/11 |
| 2017/0092850 A1* | 3/2017 | Lee | H10N 50/10 |
| 2023/0169385 A1 | 6/2023 | Meinert et al. | |

OTHER PUBLICATIONS

Pate et al. Microfabricated strontium atomic vapor cells. Optics Letter. Vol. 48, No. 2. Jan. 15, 2023.

* cited by examiner

*Primary Examiner* — Nicole M Ippolito
(74) *Attorney, Agent, or Firm* — Young Basile Hanlon & MacFarlane, P.C.

(57) ABSTRACT

A system, method, or device for providing a vacuum cell comprising a conformal coating is disclosed. The system includes (i) a vacuum cell having at least one internal vacuum chamber, the vacuum cell being formed of at least one piece, and (ii) a conformal coating on the at least one internal vacuum chamber or surface of the vacuum cell, the conformal coating having fewer seams than a number of the at least one piece.

30 Claims, 10 Drawing Sheets

CONFORMAL COATINGS FOR QUANTUM VACUUM APPLICATIONS

CROSS REFERENCE TO OTHER APPLICATIONS

This application claims priority to U.S. Provisional Patent Application No. 63/354,788 entitled CONFORMAL COATINGS FOR QUANTUM VACUUM APPLICATIONS filed Jun. 23, 2022 which is incorporated herein by reference for all purposes.

BACKGROUND OF THE INVENTION

Quantum technologies have emerged as a promising field with a wide range of applications in various industries. Vacuum cells are widely used in scientific research, industrial processes, and advanced technologies to create controlled environments with reduced pressure. Requirements of a vacuum cell include optical and electrical access, ability to inject, trap, cool, and/or interrogate a target species while maintaining a quality vacuum. Maintaining a high-quality vacuum within these cells is crucial for ensuring optimal performance and preventing the degradation of sensitive components or materials. However, traditional vacuum cell designs often face challenges in maintaining ideal pressures and performance due to effusion and diffusion issues associated with the materials, methods of manufacture and processing.

Vacuum cells create a controlled environment that allows quantum systems to operate with minimal disturbances, enabling precise manipulation, measurement, and long coherence times. Vacuum cells are essential for advancing various quantum technologies and applications by mitigating decoherence effects and providing a stable platform for quantum operations or other ultra-high-vacuum (UHV) dependent applications. However, the materials and assembly processes often have inherent drawbacks such as permeation or contamination necessitating mitigation through barrier coatings when other more fundamental changes, such as lower permeation materials, low outgassing coatings, surface area reduction through etching or polishing, etc. are not viable.

Existing barrier systems used in vacuum cells suffer from several limitations. These include inadequate coverage or sealing mechanisms, susceptibility to mechanical stress, impractical application processes, and insufficient resistance to external factors such as temperature variations, pressure differentials, or shock.

BRIEF DESCRIPTION OF THE DRAWINGS

Various embodiments of the invention are disclosed in the following detailed description and the accompanying drawings.

DETAILED DESCRIPTION

Figure 1:
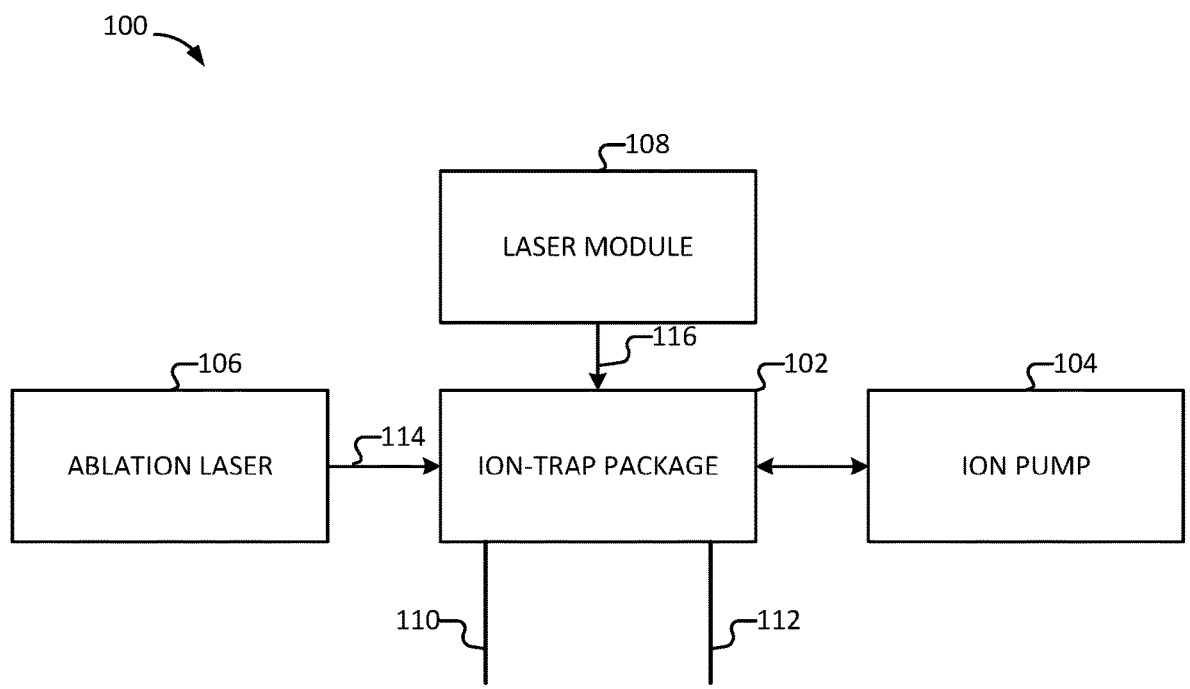
FIG. 1 is a block diagram of system for interrogating an atomic source according to various embodiments of the present application.

The invention can be implemented in numerous ways, including as a process; an apparatus; a system; a composition of matter; a computer program product (quantum or classical) embodied on a computer readable storage medium (quantum or classical); and/or a processor, such as a processor configured to execute instructions stored on and/or provided by a memory coupled to the processor whether by means such as classical, photonic, or quantum entanglement. In this specification, these implementations, or any other form that the invention may take, may be referred to as techniques. In general, the order of the steps of disclosed processes may be altered within the scope of the invention. Unless stated otherwise, an adaptive or configurable component such as a processor, writable substrate, or a memory described as being configured to perform a task may be implemented as a general component that is temporarily configured to perform the task (such as classical PROMs, FPGAs, etc. or quantum memory) at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, an atomic layer deposition (ALD) process may include a thin film deposition technique used in nanotechnology and materials science. ALD is a vapor-phase deposition process that enables precise control over film thickness and uniformity at the atomic level. ALD processes are further described in Jacob M. Pate, John Kitching, and Matthew T. Hummon, "Microfabricated strontium atomic vapor cells," Opt. Lett. 48, 383-386 (2023), the entirety of which is hereby incorporated herein for all purposes.

The present invention relates to barrier systems (or techniques for forming barriers) designed specifically for vacuum cells, aiming to improve the overall enclosure integrity and prevent the ingress or egress of contaminants into the vacuum. More specifically, various embodiments include a scalable process for forming a barrier in a vacuum cell, which will reduce manufacturing costs and provide an effective barrier for maintaining a vacuum environment, which can offer superior protection, extended environmental range, and extended service life for various vacuum cell applications.

A vacuum cell or ion trap disclosed herein is further described in U.S. Pat. No. 9,117,563 and U.S. patent application Ser. No. 17/371,899 published as U.S. Patent Application Publication No. 2021/0335591, the entireties of which are hereby incorporated herein for all purposes. Various other vacuum cells or quantum applications may be implemented in connection with the conformal coating techniques disclosed herein.

A system, method, or device for providing a vacuum cell comprising a conformal coating is disclosed. The system includes (i) a vacuum cell having at least one internal vacuum chamber, the vacuum cell being formed of at least one piece, and (ii) a conformal coating on the at least one internal vacuum chamber, the conformal coating having fewer seams than a number of the at least one piece.

Barriers are important in vacuum cells for several reasons: contamination control to prevent the ingress of contaminants, gas management to maintain the desired gas composition and pressure within the vacuum cell, to prevent the reaction of gasses in the vacuum cell with the cell walls or structures, pressure differential management to maintain a high vacuum environment, safety management to contain any potential leaks of harmful substances, and thermal insulation for temperature control within the vacuum cell. Conventionally, vacuum cell barriers are formed using line-of-sight applications, such as sputter, thermal evaporation, ion beam sputtering, etc. Some deficiencies of related art barrier systems include: permeability, chemical compatibility, mechanical strength, barrier uniformity, temperature limitations, coverage limitations (e.g., resulting from the line-of-sight nature of the coating techniques), complexity and cost, and maintenance and replacement.

Permeability: Many barrier materials, including glasses or oxides, and especially polymers, can exhibit a certain level of gas permeability. Over time, gases can diffuse through the barriers, leading to a gradual loss of the desired vacuum or gas environment. This can be problematic for long-term experiments or processes that require precise and stable gas compositions.

Chemical Compatibility: Barrier materials may not be compatible with certain gases or chemicals used in specific processes or applications. They can react with or be degraded by certain gases, limiting their effectiveness as barriers in such cases. The selection of appropriate barrier materials that are chemically compatible with the process gases is crucial to prevent degradation or failure.

Mechanical Strength: Some related art barrier materials may lack sufficient mechanical strength or durability, particularly when subjected to mechanical stress, pressure differentials, or repeated cycling. This can result in barrier failure or leakage, compromising the integrity of the vacuum or gas environment or generating particulates.

Temperature Limitations: Barriers may have temperature limitations, especially when exposed to high temperatures or thermal cycling. High temperatures can cause material degradation or dimensional changes, leading to reduced barrier effectiveness, failure, or contamination. This limitation can restrict the range of processes that can be carried out within the vacuum cell.

Complexity and Cost: Depending on the specific requirements and performance needed, developing and implementing effective barrier systems can be complex and costly. Achieving high-performance barriers often involves the use of multiple layers, coatings, or advanced materials, increasing the complexity and cost of the overall system.

Maintenance and Replacement: Over time, barriers may require maintenance or replacement due to wear, aging, or degradation. This can involve reprocessing or disassembling the vacuum cell and replacing, augmenting, or repairing the barrier material, leading to downtime and added costs.

In addition to the foregoing deficiencies, as vacuum structures become smaller to scale for products and deployment into the field, there is a need for simpler processes for forming of the barrier and that can provide a sufficient barrier for more complex features and smaller sizes. Conventional barrier forming processes are generally restricted to line-of-sight only applications or require a wet chemistry that is generally incompatible with other components or processes associated with the manufacture and use of vacuum cells.

Various embodiments provide a method for forming a conformal barrier and optical coatings and a vacuum cell with a conformal barrier and optical coatings, such as for cold atom system applications. The conformal coating may be formed via physical vapor deposition (PVD), chemical vapor deposition (CVD), low pressure chemical vapor deposition (LPCVD), plasma-enhanced chemical vapor deposition, other vapor phase processes, or liquid phase conformal coating processes (e.g., electro/electro-less plating), etc. In some embodiments, the conformal barrier (e.g., conformal coating) and optical coating (e.g., an anti-reflective coating, high-reflective coating, etc.) is formed using an ALD process. The conformal coating is applied to the inner surface of a vacuum chamber of a vacuum cell. Additionally, a conformal coating may be applied to an external surface of the vacuum chamber. The additional conformal coating on the external surface, especially after evaluating the cell, makes the barrier system more resilient because the external barrier coating decreases the deleterious effect of a defect within the vacuum chamber (e.g., a defect on the internal conformal barrier coating owing to poor convection/conduction of coating precursors, contamination, vacuum processing, or other factors). In other alternative implementations, the conformal coating is applied to the external surface of the vacuum and not the internal surface of the vacuum chamber.

FIG. 1 is a block diagram of system for interrogating an atomic source according to various embodiments of the present application. System 100 includes ion-trap package 102, ion pump 104, ablation laser 106, and laser module 108 (e.g., an ionization laser).

Ion pump 104 is a compact, conventional ion pump that is fluidically coupled with ion-trap package 102.

Ablation laser 106 is a pulsed laser source suitable for providing ablation signal 114 to material (e.g., the atomic source) within ion-trap package 102 to generate an atomic flux. As discussed below, optical access for ablation signal 114 to the material to be ablated is enabled by the inclusion of a window in ion-trap package 102. In the depicted example, ablation laser 106 is a Q-switched Nd:YAG pulsed laser having a wavelength of 1064 nm that provides 8-ns wide pulses having 0.3 mJ pulse energy; however, other laser sources can be used in ablation laser 106. Various other types of activation sources different from an ablation laser may be implemented. For example, in some implementations, a continuous-wave (CW) source may be used to thermally activate an atomic source such as thin-films of deposited atoms.

Laser module 108 includes conventional laser sources for providing laser signal 116, which includes wavelengths suitable for ionizing neutral atoms within ion-trap package 102, Doppler cooling and detection, and optical re-pumping. In the depicted example, laser module 108 includes continuous wave (CW) lasers having wavelengths of 355 nm, 391 nm, 399 nm, 370 nm, 638 nm, and 935 nm.

Radio Frequency (RF) port 110 and DC port 112 are conventional electrical feed-throughs for enabling external electrical connections for RF and DC electrical signals to the electrodes of ion trap 202.

Although the description of the trapping hardware is described below with respect to FIG. 2 as an ion-trap, various other macroscopic traps may be used, such as 3D traps and surface traps.

Figure 2:
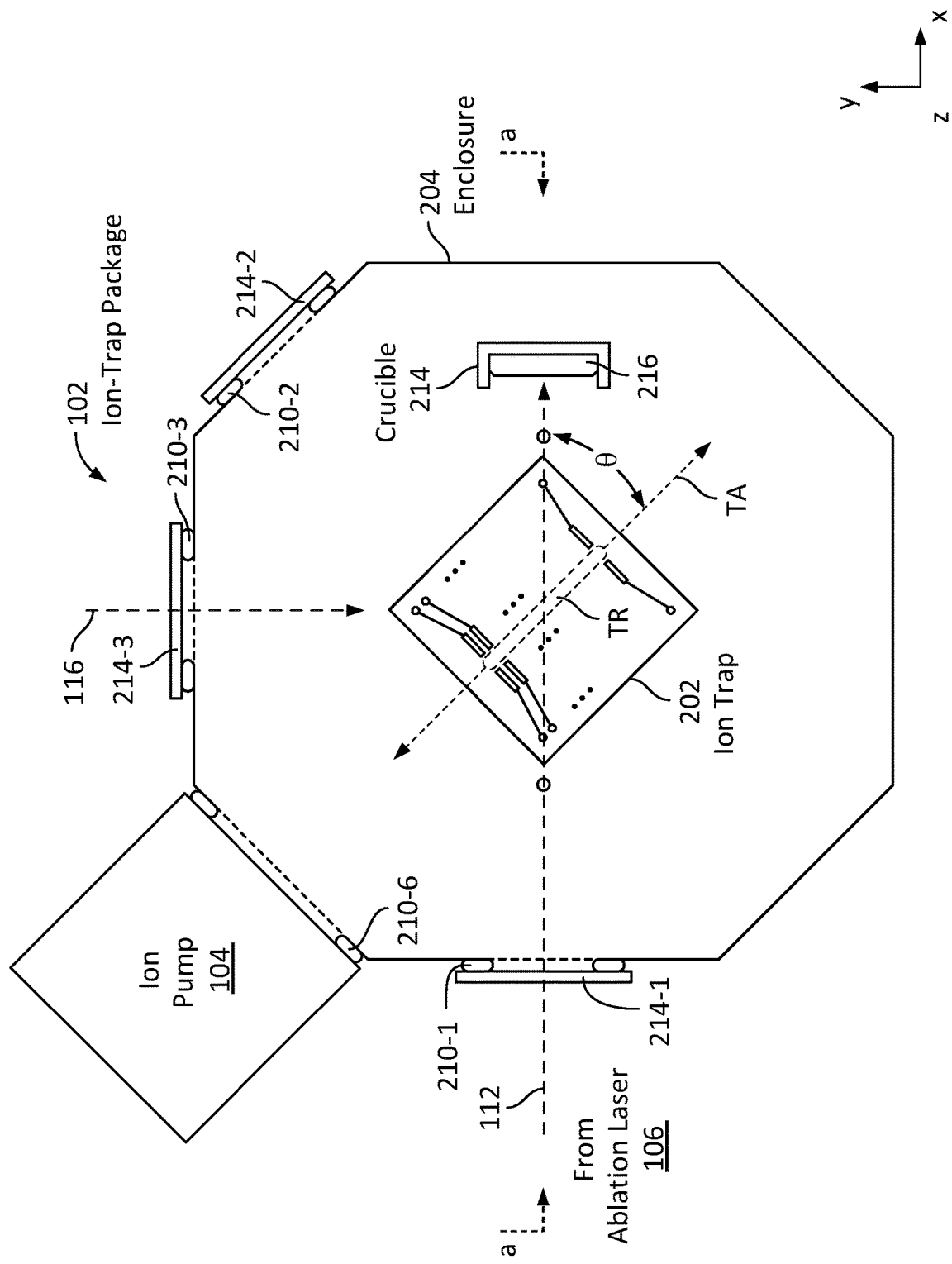
FIG. 2 is a block diagram of an ion-trap according to various embodiments of the present application.

FIG. 2 is a block diagram of an ion-trap according to various embodiments of the present application. Ion-trap package 102 includes ion trap 202 and enclosure 204, which encloses the ion trap within an ultra-high vacuum (UHV) environment.

Ion trap 202 is a conventional micromachined surface ion trap. Examples of surface ion traps suitable for use in accordance with the teachings of the present disclosure include the Sandia National Laboratories HOA 2.0 ion trap, and the like. As will be appreciated by one skilled in the art, a micromachined surface ion trap includes a plurality of electrodes disposed in two one-dimensional arrays on the surface of a substrate such that the electrodes define linear trap region TR between the linear arrays. The longitudinal axis of trap region TR defines trap axis TA.

The electrodes of the ion trap are electrically coupled with bond pads, which are wire bonded to RF port 110 and DC port 112 (not shown in FIG. 2) to enable a desired arrangement of RF and DC electrical signals at the ion trap.

Enclosure 204 includes a plurality of piece parts comprising the chip carrier and the housing, which includes a sidewall and lid. The housing is a unitary structure that includes contiguous portions that define the sidewall and lid. For example, in some embodiments, the housing is machined from a solid block of material, thereby forming a single continuous element that includes the sidewall and lid.

Enclosure 204 of ion trap 202 also includes windows which are mounted in the sidewall, and a window which is mounted in the lid. Windows 214-1 through 214-3 are affixed within the housing via UHV seals 210-1 through 210-3, respectively, such that the windows and UHV seals are substantially impermeable to small-molecule gases, such as hydrogen, helium, etc. Preferably, the windows are made of, or otherwise include a layer of barrier or single-crystalline material. For example, the windows are made of a single-crystal material that also mitigates diffusion of small-molecule gases. The layer of single-crystalline material in connection with the windows material may replace a bulk single-crystalline window to mitigate diffusion while minimizing the optical properties of bulk crystalline material, such as birefringence.

In the depicted example, the chip carrier and housing are aligned and joined such that trap axis TR is oriented along the ion pump direction and trap axis TA is oriented at angle, θ, relative to the direction of propagation of ablation signal 114. In the depicted example, θ is equal to approximately 45° such that the ablation signal crosses trap region TR at a diagonal.

Optical access for ablation signal 114 is enabled by window 214-1, which allows the ablation signal to access material 218 in crucible 216 (or other suitable target holder) to ablate the material (e.g., the target species of the atomic source) and generate an atomic flux. In the depicted example, material 218 may be barium or calcium.

In similar fashion, optical access to ion trap 202 for laser signal 116 is enabled by window 214-2.

In the depicted example, each of UHV seals 210-1 through 210-6 is a direct laser-weld joint. In some embodiments, at least one of UHV seals 210-1 through 210-6 is a different UHV seal, such as a compressible metal flange (e.g., a copper flange, etc.), brazing joint, or UHV-compatible solder ring comprising a material suitable for use in UHV systems such as, without limitation, indium, gold-tin, and the like. In such cases the barrier coating may be applied before sealing if chemically and mechanically compatible, or after especially if the seal may be permeable or vulnerable to some gases or species.

The chip carrier and housing are joined via a UHV seal. In the depicted example, the UHV seal is a solder seal comprising indium. The formation of UHV seals completes enclosure 204, thereby sealing ion trap 202 within chamber 212 with an internal UHV environment equivalent to that within a UHV chamber. In other words, the chamber contains an environment in which the pressure is less than or equal to $10^{-9}$ Torr.

In the depicted example, once fully assembled, enclosure 204 comprising the chip carrier has overall dimensions of approximately 130 mm by 100 mm by 70 mm. As will be apparent to one skilled in the art after reading this Specification, however, these dimensions are merely exemplary and enclosure 204 can have any practical physical dimensions without departing from the scope of the present disclosure.

In some embodiments, the piece parts of enclosure 204 to be joined are provided with groove rings and frames that interlock to ensure a reliable seal when welded or joined via a compressible metal flange and/or UHV-compatible solder.

Although enclosure 204 is assembled and joined with ion pump 104 prior to placing it in a UHV chamber (with the exception of seal 210-6), in some embodiments, more of enclosure 204 assembly is completed within the UHV chamber itself (e.g., at least one of windows 214-1 through 214-3 and/or the lid is joined to a sidewall, and or the sidewall is joined with the chip carrier, etc.). Furthermore, a fully or partially assembled enclosure 204 is joined with ion pump 104 while they are both located within the UHV chamber.

UHV seals are used to join the piece parts of enclosure 204 and sealing enclosure 204 while its internal chamber has a pressure that is less than or equal to $10^{-9}$ Torr affords significant advantages over other ion-trap systems, including one or more of: (a) excluding unreliable pinch-off tubes; or enabling operation at temperatures above cryogenic temperatures (e.g., greater than or equal to −50° C.); (b) significantly smaller overall ion-trap system volume; or (c) enabling an ion-trap system that is cryogenic-pump-free.

For example, in the illustrative embodiment, the chamber has a volume of only approximately 2 cm$^3$. In some embodiments, the volume of chamber is other than 2 cm$^3$; however, it is preferably less than 10 cm$^3$.

The pressure in chamber is reduced to $10^{-10}$ Torr or less. In the depicted example, ion pump 104 is engaged to reduce the pressure within the chamber to $2 \times 10^{-11}$ Torr or less. The ion pump may be excluded in favor of passive pumping, especially if an effective conformal barrier coating is utilized. Further, an effective barrier coating may obviate the need for any pumping after the chamber is reduced to $10^{-10}$ torr.

As will be apparent to one skilled in the art, the quality of the vacuum in a trapped-ion system dictates the lifetime of an ion chain. The elastic-collision rate between the residual background gas molecules and the trapped ions is a critical parameter of a trapped ion-based quantum computer, because these collisions with sufficient kinetic-energy transfer can significantly disrupt a trapped ion chain. To reliably maintain a chain of ions over the periods of time required for quantum computation, the level of vacuum must be in the UHV regime (preferably approximately $10^{-11}$ Torr or better).

A vacuum cell or ion trap disclosed herein is further described in U.S. Pat. No. 9,117,563 and U.S. patent application Ser. No. 17/371,899 published as U.S. Patent Application Publication No. 2011/0335591, the entireties of which are hereby incorporated herein for all purposes. Various other vacuum cells or quantum applications may be implemented in connection with an atomic source disclosed herein.

According to various embodiments, at least an inner or exterior wall/surface of enclosure 204 has a conformal coating thereon. Enclosure 204 may have a conformal coating (e.g., a barrier coating, such as a coating that prevents helium permeation) on an inner wall (e.g., the wall defining the vacuum chamber), an exterior wall, or both. In the case of forming the conformal coating on the interior wall, ion trap package 102 may be assembled and substantially sealed before applying the conformal coating. For example, enclosure 204 may be sealed except for a single or a small number of introducer openings (e.g., an aperture, window, or wall opening) via which the vapor for the vapor deposition is introduced to the interior of the vacuum chamber. The system may implement an ALD coating process according to which precursor gases are introduced to the interior of the vacuum chamber via the introducer opening or pump-out port. As an illustrative example, ion trap package 102 may be fully assembled except for the application of UHV seal 210-1 and the space where UHV seal 210-1 will be introduced when fully sealing ion trap package 102 may be used to introduce the precursor gases for the ALD coating process.

Various embodiments provide conformal coatings that function as helium permeation barrier coatings, alkali/alkaline earth (corrosive or reactive species) passivation coatings, and/or as optical coatings to a cell component (e.g., an anti-reflective coating). The conformal coatings are applied in a conformal manner, typically via a vapor phase and can be self-limiting and topographically conformal to properly prepared surfaces. The conformal coatings may be a single application coating or a multiple homogeneous or heterogeneous application coatings, such as graphene, aluminum oxide, silicon oxide, or other oxides, nitrides, etc. The conformal coatings provide a barrier that overcomes inherent material detractors such as a relatively high helium permeation rates in fused silica or borosilicate float glasses (e.g., Borofloat® glass) commonly used in vacuum cells, or high permeation material transitions or interfaces between joints of similar or dissimilar materials. In some embodiments, the conformal coating for an internal vacuum chamber of a vacuum cell has fewer seams than a number of seams among the piece(s) that form the internal vacuum chamber.

In-situ conformal coating processes can be modified thermally, electromagnetically, or optically with conformal masked radiation, ion, or particle bombardment, such as with writing lasers to encourage or discourage chemical reactions or bonding chains locally.

In ALD processes, thin films are grown by sequentially exposing a substrate to two or more precursor gases. Each precursor gas reacts with the surface of the substrate in a self-limiting manner, forming a single atomic layer. The deposition process typically consists of several cycles, with each cycle depositing a single atomic layer. In some case a seed layer of an additional precursor species or material to allow for a uniform and continuous coating of the intended ALD functional coating.

The self-limiting nature of the reactions is a key feature of ALD. The precursor gases react with the surface of the substrate until all available reactive sites are consumed, resulting in a fully saturated atomic layer. Excess precursor and reaction by-products are then purged from the reaction chamber before introducing the next precursor gas for the subsequent cycle. This self-limiting behavior ensures precise control over film thickness and allows for conformal coating on complex three-dimensional structures. In addition, ALD barriers are not restricted to line-of-sight applications. The precursor gases can be introduced to the vacuum cell (e.g., vacuum chamber) via a small opening and the gases diffuse and react with the substrate at all surface locations. Gases may also be injected using protruding nozzles, needles, etc. to improve the otherwise slow diffusion rate though low conductance pathways or channels. Sealed or semi-sealed arrayed assemblies may be utilized to aid in process speed by helping to force flow through an array of samples with poor conductance pathways where diffusion may be prohibitive, or pump-downs may be too slow. In such cases non-reactive purge gases may be used to help extract or displace leftover precursors.

ALD can deposit a wide range of materials, including metals, oxides, nitrides, sulfides, sapphire, and more. The choice of precursors determines the composition of the film. The process is typically carried out in a vacuum or low-pressure environment to facilitate the gas-phase reactions.

According to various embodiments, the materials or chemicals used to yield the final conformal coating may be selected based on their optically transmissive and/or helium permeation properties. For example, the conformal coating material comprise an aluminum oxide, a silicon nitride, a metal oxide, graphene, etc. Alternatively, or additionally, the materials or chemicals may be selected based on alkali resistant, repellant, or attractant properties, or to otherwise yield a conformal coating having surface features, structures, microstructures, field plates, etc.

Related art vacuum cells are coated using line-of-sight coating processes. However, such line-of-sight coating processes do not yield full coating over complex structures, such as in areas masked/shadowed from the line-of-sight. Because related art coatings are not conformal in nature, the entire vacuum chamber is not sealed and, as an illustrative example, the vacuum chamber may be subject to gas permeation (e.g., helium permeation) or surface degassing.

Various embodiments implement a coating technique that yields a conformal coating. The coating technique may use a vapor deposition coating technique, such as ALD. Alternatively, a traditional line-of-sight-based coating process (e.g., sputter, thermal evaporation, ion beam sputtering, etc.)

may be implemented in a vacuum and controlled partial vacuum and precursor or reactive gas purged and pumped environments while using two-dimensional or three-dimensional topographical or conformal mask coatings or mask assemblies to mask two-dimensional or three-dimensional topographies. The parts to be coated and their mask and holding assemblies may be rotated on at least one internal or external axis to reduce the shadowing effects of the three-dimensional topography of the mask itself or the part or mask and part assembly. Accordingly, the traditional line-of-sight coating processes may be implemented in a manner that provides coatings (e.g., an internal coating for a vacuum chamber) that are substantially conformal, thereby curing deficiencies of such traditional coating processes.

Some coating techniques include inserting reactive heads, such as thermal evaporation boats or filaments, or small targets with ion beam paths within the contained volume of a part through an open wall or aperture to allow the source of the coating to move within and throughout the part being coated. Others may use a purge gas head as the sole source and possibly extractor of precursor(s) for ALD type processes, in an otherwise clean vacuum environment. This may be implemented to selectively target primarily or exclusively inner surfaces for coating and saving valuable precursor(s) or protecting external surfaces from coating. ALD precursors may also be flown through moat channels between the external surfaces of the cell and the internal vacuum chamber to aid in sealing the inner chamber while minimally coating critical internal components of the inner chamber.

Figure 3A:
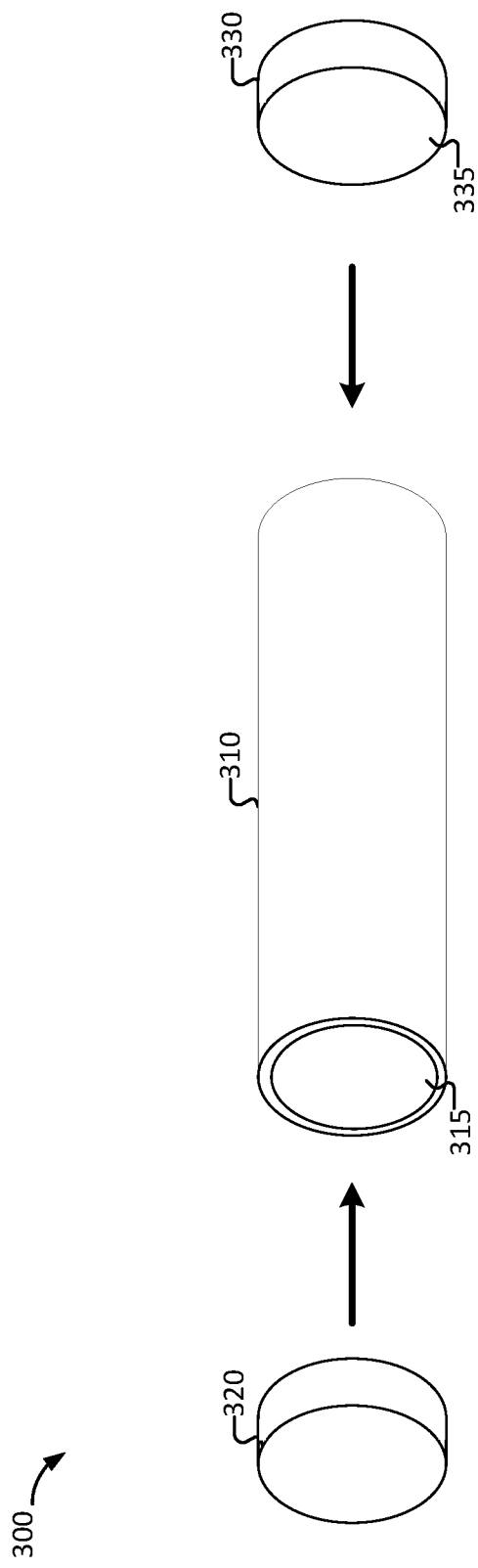
FIG. 3A is a diagram of system of a vacuum cell according to various embodiments of the present application.

FIG. 3A is a diagram of system of a vacuum cell according to various embodiments of the present application.

According to various embodiments, at least one surface on which the conformal coating is to be applied (e.g., formed, deposited, etc.) is part of a vacuum barrier, such as a wall or an internal chamber defining an internal volume. As an example, the conformal coating is used in a vacuum cell that is operated at pressures below $1e^{-6}$ torr. The conformal coating may be applied conformally over a thin membrane of more permeable materials (e.g., glasses such as fused silica, semiconductors, or polymers such as Kapton, etc.) or over material transition interfaces (e.g., bonds between glasses, silicon, metals, etc.), or over entire vacuum enclosures such as optical vacuum cells, vacuum ion trap package assemblies, vacuum channel cells, vapor cells, glass to metal transitions, conflat-based viewports, conflat glass-to-metal transitions, fiber optic feedthroughs, slumped joints, metal pin feedthroughs, vias, atom chip assemblies, or other materials. The conformal coating is configured to block permeation, such as permeation through higher permeation seams. The higher permeation beams may comprise $SiO_2$ formed at anodic bonding seams, or adhesive, epoxy, or frit joints.

In the example shown, a vacuum cell assembly is shown for vacuum cell 300. Vacuum cell comprises body 310 and ends 320 and 330. In a fully assembled state, ends 320 and 330 are affixed/connected to body 310. In some embodiments, the conformal coating is applied to at least one of the surfaces forming the interior vacuum chamber of vacuum cell 300 or the surface forming the external walls of the vacuum chamber or vacuum cell 300. For example, in the event that the interior of the vacuum chamber is configured to have a conformal coating, the conformal coating is applied to interior wall 315 of body 310, inner surface 335 of end 330, and the corresponding interior wall of end 320.

Coating the interior of the vacuum chamber formed by vacuum cell 310 (e.g., the interior walls that comprise the vacuum chamber) may include partially assembling vacuum cell 300 by affixing end 330 to body 310 and applying the conformal coating to interior wall 315 and at least part of inner surface 335 (e.g., the part of inner surface 335 corresponding to the inner wall of the vacuum chamber. The face of end 320 that will correspond to the interior wall of vacuum cell 310 may also be coated. Alternatively, ends 320 and 330 may be affixed to body 310 in a manner that an introducer opening (e.g., an aperture) remains in vacuum cell 300 via which the coating may be applied such as via APD (e.g., an aperture via which the precursor gases are introduced during the coating process).

The conformal coating can be applied to various types of materials. For example, body 310 and/or ends 320, 330 may be glass (e.g., fused silicon), a semiconductor, a polymer, a metal, graphite, etc. In some implementations, the conformal coating is applied over a plurality of materials, such as material transition interfaces between components. As an example, end 330 may be a metal and body 310 may be a glass. Because the conformal coating is applied after assembly to affix end 330 to body 310, the interface at end 330 and body 310 has a conformal coating applied thereto.

In some embodiments, the conformal coating(s) is applied over an existing coating or surface treatment, such as a coating applied via the same coating technique as the conformal coating (e.g., ALD) or an alternative coating/processing technique. In such cases, the conformal coating is added to protect, passivate or complement the underlying coating(s). The existing/underlying coating(s) may be shaped or pre-textured, such as with ultrafast laser texturing or etching, wet chemical or plasma etching, stamp patterning, etc. The existing/underlying coating(s) may be configured to create gradient anti-reflection meta surfaces, reflective or transmissive refractive and/or diffractive optics (e.g., diffractions gratings or lenses), meta surface optics or RF structures, MEMs devices, and actuators.

The existing/underlying coating(s) can be sacrificial acting as removable masks such as photoresist or similar sacrificial or removable coatings. Additionally, or alternatively, the existing/underlying coating(s) may comprise a patterned or unpatterned anti-reflective coating, high-reflective coating, conductive coating, an insulative coating, a barrier coating, etc. For example, the earlier coatings may be applied or processed to create simple or spatially and geometrically complex layers over which the conformal coating is applied in a manner that substantially maintains the properties of the underlying coating (e.g., an ALD conformal coating is applied such that the conformal coating does not inhibit refractive properties of the existing/underlying layer).

In some embodiments, the conformal coating is post-processed to create meta structures on the surface thereof. For example, the conformal coating is post-processed to exhibit surface properties, such as to cause the conformal coating to act as a diffractive grating, an anti-reflective surface, a beam dump, etc. The post-processing of the conformal coating may include forming grooves or other geometries in the conformal coating. The post-processing can be performed using an ultrafast laser for texturing, subtractive machining, additive machining, etching, melt or glass draw processes, semiconductor processes, or micro-electromechanical systems (MEMS) processes. As an example, an ultrafast laser is used to ablate the surface of the conformal coating to create a meta surface. Meta surfacing is also, or additionally, performed by flowing, molding, stamping, machining, or etching the coating (e.g., the conformal coating). Meta surfacing may include growing, etching, or otherwise forming subwavelength structures, such as to diffract light passing through or to function as a lens). The meta surfacing of the conformal coating to have a gradient index enables the conformal coating to function as an anti-reflective coating or light beam absorption. Because the conformal coating can round out edges or features for some geometries (e.g., of existing/underlying coatings), rather than, or in addition to, creating the surface features on the underlying coatings, the conformal coating may be processed to comprise the intended surface features.

In some embodiments, layers of the conformal coating are alternatively conductive and insulative to absolute or varying degrees. For example, the conformal coating can be applied in a manner to establish a complex electric field or circuit path three-dimensional control by using complex multilayered stacks for precise control and intentional or unintentional electric field control and mitigation. Ultra-thin stacks of alternating relative conductor and insulator layers can be used for magnetic field mitigation by counterpropagating electric current return paths directly over their respective initial forward paths, or to form capacitors. The layers may be perfectly aligned or engineered to have subsequent layer offsets for ultra-precise magnetic field control (e.g., at the microscopic scales and below).

Figure 3B:
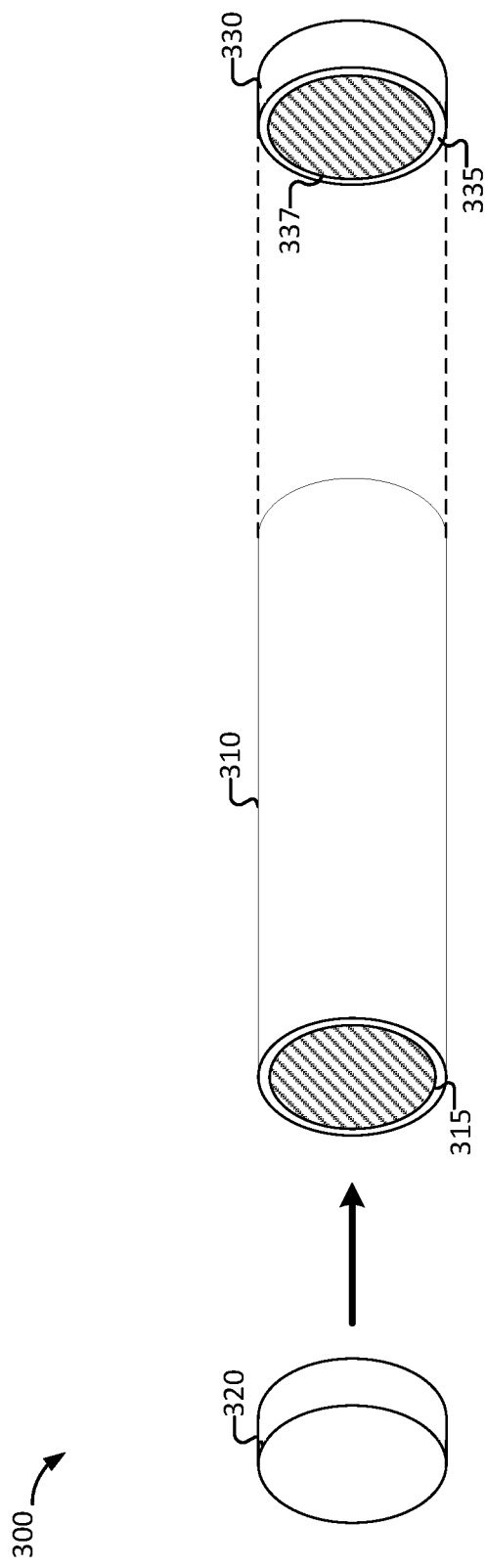
FIG. 3B is a diagram of system of a vacuum cell according to various embodiments of the present application.

FIG. 3B is a diagram of system of a vacuum cell according to various embodiments of the present application. In the example shown, inner wall 315 of body 310 comprises a conformal coating thereon. Similarly, interior wall 337 on inner surface 335 of end 330 comprises the conformal coating. Different materials in vacuum cells diffuse gases (e.g., the same or different gases) at different diffusion rates. Further, materials used in connection with assembling vacuum cell 300 may soak up (e.g., absorb or adsorb) a contaminant (e.g., a molecules or ions, such as an alkali or alkaline) from its surroundings during fabrication. The conformal coating may provide a barrier that prevents such sorbed contaminants from permeating the material and contaminating the vacuum cell. As shown, the conformal coating on inner surface 335 is formed up to and at the interface between body 310 and end 330, thereby providing an effective barrier, such as a barrier for permeation of certain gases (e.g., helium).

In order for most cells to get to a minimum pressure, the presence of background gases is to be minimized. Background gases can introduce noise into the quantum systems. Although proper cleaning mitigates background gases for most materials, other materials such as glass (e.g., which is used for optical transmission of a laser or is otherwise easier for manufacturing) has higher helium permeation rates, and applications without ion pumps can experience a build-up of background gases.

Because ALD coats everything to which the vapor is exposed (e.g., the unmasked portions), ALD provides an effective bridge over a gap between different materials (e.g., at material transition interfaces, such as metal to glass interfaces). Vacuum cell 300 is mostly assembled and thereafter the conformal coating is applied. The conformal coating may be applied after the substrate (e.g., the assembly) is cleaned and before the substrate is put into a vacuum, thereby reducing processing time and cost of manufacturing.

Although the example shown comprises a vacuum cell having a single vacuum chamber, the coating technique for applying a conformal coating may be implemented on vacuum cells having a plurality of vacuum chambers to apply the conformal coating on the surfaces of all the plurality of vacuum chambers. As an example, each vacuum chamber is fluidically connected (e.g., via a channel, etc.) with another, thereby allowing the coating to be applied (e.g., the vapor in an ALD process permeates throughout the plurality of vacuum chambers and applies a coating on the surfaces thereof).

In some embodiments, a vacuum cell on which a conformal coating is applied has a thickness of 1 mm to 4 mm, and a second dimension of 1 inch to 4 inches. As an example, the second dimension may be a diameter. In some embodiments, a vacuum cell on which the conformal coating is applied has a cell volume of at least 1 cc. In some embodiments, a vacuum cell on which the conformal coating is applied has a cell volume of at least 1/10 cc.

In some embodiments, the conformal coating has a thickness of at least 50 nm. The conformal coating may have a thickness of 100 nm or more. In some embodiments the conformal coating may be injected through a fill or tipoff port or tube, after the coating is applied the cell may be pumped out through said tube and then the tube is sealed. Sealing may be a capping such as an anodic or contact bonding, or sealing may involve tipoffs such as melting glass with a flame or radiant or resistive heat to deform the tube to collapse and seal such that the entire inside surface is conformally coated including the collapsed tube or tipoff.

In some embodiments, the conformal coating comprises one or more of a sapphire, a graphene a carbide, and a nitride.

In some embodiments, the inner surfaces of ends 320 and/or 330 are conformally coated before assembly to body 310. To improve the contact at the interface of an end 320 or 330 and body 310, the coating may be removed or otherwise treated. As an example, after coating the entire inner surface 335 may be coated, and prior to assembly the inner surface is treated to leave the coating at the area of inner wall 337. For example, an ultra-fast laser is used to laser anneal the area of inner surface 335 at which end 330 interfaces with body 310. The laser annealing keeps the annealing and exposure to a very precise localized area. As another example, the area of inner surface 335 at which end 330 interface with body 310 is polished to remove the coating from the area to ensure that the coating does not interfere with the bonding at the mating surface. Laser annealing may instead be used as a laser diffusion operation causing the localized region of barrier material to diffuse into the surrounding bulk glass creating a more uniform material transition between mating and now sealed parts.

Figure 4:
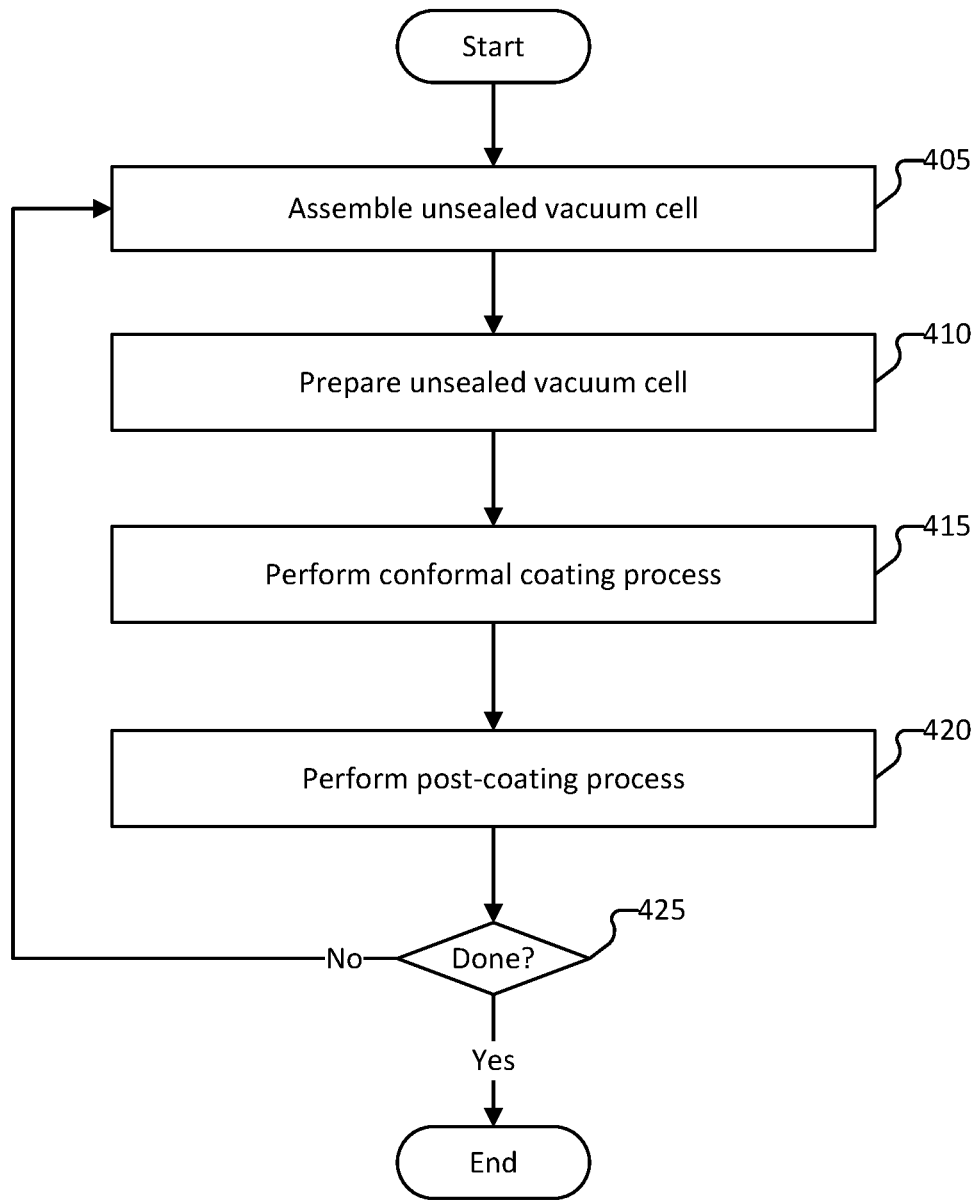
FIG. 4 is a flow diagram of a process for providing a vacuum cell having a conformal coating according to various embodiments of the present application.

FIG. 4 is a flow diagram of a process for providing a vacuum cell having a conformal coating according to various embodiments of the present application.

At 405, an unsealed vacuum cell is assembled. The unsealed vacuum cell is almost fully assembled (e.g., at least 95% assembled, or more preferably, at least 99% assembled) from one or more pieces that may be the same or different materials. Examples of materials that may be comprised in the vacuum cell structure include glasses such as fused silica, semiconductors, or polymers. The vacuum cell may have certain material transitions, such as at the interface of components comprising different materials. Examples of material transitions include bonds between glasses, silicon, and/or metals.

In some embodiments, the unsealed vacuum cell is assembled to an extent that a single (or a few) introducer openings or conductance ports (e.g., wall openings, apertures, etc.) exist via which, in the case of a vapor deposition coating technique, the vapor may enter (e.g., be introduced) the vacuum cell to where the parts to be coated are exposed. For example, the vacuum cell is left unsealed to an extent that vapor can enter the internal chamber(s) of the vacuum cell for deposition of the conformal coating.

At 410, the unsealed vacuum cell is prepared. In some embodiments, the surface(s) on which the conformal coating is to be applied is pre-processed either to create some functionality (e.g., to create a meta structure or surface finish that performs a desired function such as a diffraction grating), or to prepare the surface(s) for the conformal coating (e.g., to clean the surface(s) or texture the surface for better adhesion). For example, the surface(s) on which the conformal coating is to be applied may be processed to comprise an adhesion layer, an anti-reflective layer, etc.

The surface(s) on which the conformal coating is to be applied can be glasses, semiconductors, metals, graphite, polymers, etc. The surface(s) may be formed by subtractive machining, additive machining, etching, melt or glass draw processes, semiconductor processes, or MEMS processes, etc.

At 415, a conformal coating process is performed. The conformal coating process includes applying a conformal layer or over entire vacuum enclosures such as vacuum cells (e.g., optical vacuum cells), vacuum ion trap package assemblies, vacuum channel cells, vapor cells, glass to metal transitions, conflat-based viewports, conflat glass-to-metal transitions, fiber optic feedthroughs, slumped joints, metal pin feedthroughs, vias, atom chip assemblies, ion trap cells, vacuum tubes, electrode vapor cells, Bose-Einstein condensate (BEC) enabled cells, other ultracold cells, or other materials.

In some embodiments, the conformal coating is applied to a part of the vacuum cell or an entirety of a vacuum cell. In the case of the conformal coating being applied to part of the vacuum cell, the conformal coating is applied to a masked or unmasked assembly. The conformal coating is used as a barrier to protect the vacuum within a vacuum chamber (e.g., to inhibit diffusion and/or permeation) and for its dielectric properties (e.g., to serve as a dielectric coating). As an example, the conformal is one or more of: an alkali barrier, a barrier to helium diffusion, and an outgassing barrier.

In some embodiments, the conformal coating process includes performing an ALD technique to deposit a conformal coating of a desired thickness. The thickness of the conformal coating may be at least 50 nm. In cases, the thickness of the conformal coating is 100 nm or more. Although the conformal coating process described in process 600 is for an ALD process, various other coating techniques may be implemented, such as other vapor deposition techniques, or traditional line-of-sight coating techniques in a manner that the parts of the vacuum cell to be coated and their mask and holding assemblies may be rotated on at least one internal or external axis to reduce the shadowing effects of the three-dimensional topography of the mask itself or the part or mask and part assembly.

The conformal coating may comprise various materials. Examples of materials include sapphire, a graphene a carbide, and a nitride. Various other types of materials may be implemented. In some embodiments, the conformal coating comprises a plurality of layers, and a first subset of the conformal coating layers may comprise the same or a different material as the materials comprised in a second subset of the conformal coating layers.

At 420, a post-coating process is performed. In some embodiments, after the conformal coating has been formed on a target substrate (e.g., at least a part of the vacuum cell assembly), the conformal coating is post-processed, such as to include polishing, texturing, surface engineering (e.g., to create surface meta structures, etc.), and to finalize assembly of the vacuum cell (e.g., to seal the vacuum cell).

The post-coating processing may include a surface engineering to create an etched laser patterned or otherwise patterned surface to form patches of insulators or conformal oxides over otherwise conductive sublayers to control the electric field geometries and potentials, and to control buildup and passive or active charge migration.

In some embodiments, the post-coating process includes one or more of shaping or texturing at least part of the conformal coating using ultrafast laser texturing or etching, wet or chemical etching, stamp patterning, etc. The post-coating process may be performed to create gradient anti-reflection meta surfaces, reflective or transmissive refractive and/or diffractive optics (e.g., diffraction gratings or lenses), meta surface optics or RF structures, MEMS devices, actuators, etc. The post coating process utilizing ultrafast laser or other laser, or focused radiation or energetic operations may be used to selectively pierce the barrier coating allowing limited diffusion or migration through the coating breaches to act as source particle/gas nozzles, allowing transport of species otherwise trapped, sealed, or stored below.

After the application of the conformal coating, the system may perform post-annealing steps, such as to modify the adhesion properties or stress profile(s) coating and/or target substrate on which the conformal coating was applied or other part of the vacuum cell assembly. The post-annealing processing may include environmental baking/annealing, or locally annealing isolated regions such as using a torch or plasma and reaction or heat shield/mask/spreader, or a high power or ultrafast laser. To localize the annealing processing, in the case of the use of a high power or ultrafast laser, the laser can be focused or defocused (e.g., on the order of tens or hundreds of microns) to a precise degree and normal or at an oblique or shear angle to the surface or interface being thermally or plasma treated. The power levels of the lasers may be controlled to approach, meet, or exceed the annealing temperatures of the conformal coating and/or target substrate. The heating and annealing with a micro torch or radiation via an ultrafast laser can be used to encourage diffusion between conformal interfaces.

The post-coating processing may be used to reduce stress induced birefringence or to engineer a particular birefringent profile via controlled creation of stress points through overheating, local annealing, and/or rapid cooling (e.g., using macro or micro air or coolant flow).

The conformal coating may be subject to delamination at material interfaces, such as at the interface between the conformal coating and the target substrate, or at material transitions comprised in the target substrate (e.g., metal to glass transitions, etc.). Treatment of the vacuum cell (e.g., the conformal coating) at the interface between the conformal coating and the target substrate or between layers in a stack of layers of the conformal coating may create an effective diffusion or blending of the layers locally or uniformly. For example, index transitions can be blended, layers that tend to delaminate can be more permanently affixed, weakly bonded (e.g., contact, anodic, hydroxide, etc.) materials can be reinforced or made stronger. Further regions comprising particular properties (e.g., conductivity, a refractive index, etc.) can be modulated or neutralized by blending or diffusing into adjacent layers.

The blending of adjacent layers can be helpful to obtain desired material properties. For example, with deposited opaque materials such as metals or semiconductors (e.g., silicon) onto glass or oxides, if the deposited layer is sufficiently thin, the blending of the layer can cause the opaque materials to oxidize with the free or chemical oxygen or with the oxygen in or comprising the substrate below, etc. The oxidization of the sufficiently thin opaque material may be improved when the post-coating processing is performed under an oxygen environment or oxidizing bath. As an illustrative example, a layer of metal or silicon can be processed to form a metal oxide or silicon oxide, which are typically more optically transparent and less conductive than the unprocessed layer (e.g., the metal or silicon). Other materials may be selected, and post-coating processed to change the conductivity or opacity of the materials.

Although process 400 is described as comprising the post-coating process of 420, the post-coating processing may include only finalizing assembly of the vacuum cell to create the vacuum seal. In other words, according to various embodiments the conformal coating is not post-processed (e.g., no texturing or surface engineering is performed on the conformal coating).

At 425, a determination is made as to whether process 400 is complete. In some embodiments, process 400 is determined to be complete in response to a determination that no further conformal coatings are to be formed onto substrates (e.g., to serve as barriers for a vacuum chamber(s)), no further post-processing is to be performed on the conformal coating (e.g., no further texturing, etching, etc. is to be performed), no further vacuum cells are to be coated, a user has exited the system, or otherwise indicates that process 400 is to be paused or stopped, etc. In response to a determination that process 400 is complete, process 400 ends. In response to a determination that process 400 is not complete, process 400 returns to 405.

Figure 5:
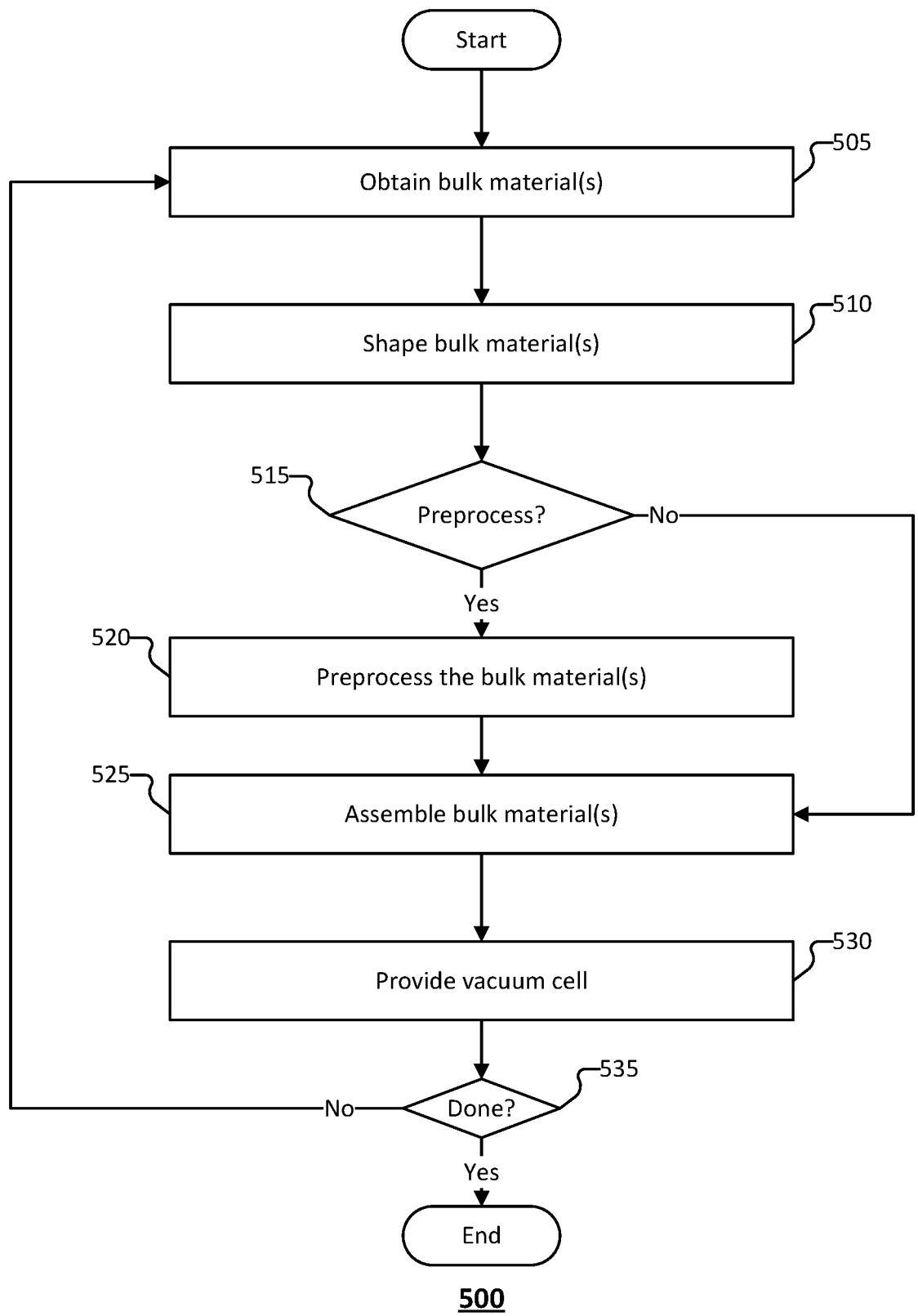
FIG. 5 is a flow diagram of a process for assembling an unsealed vacuum cell according to various embodiments of the present application.

FIG. 5 is a flow diagram of a process for assembling an unsealed vacuum cell according to various embodiments of the present application. In some embodiments, process 500 is invoked by process 400, such as at 405 and/or 410 of process 400.

At 505, a bulk material(s) is obtained. The bulk material is the material from which the parts of the vacuum cell are created.

At 510, the bulk material(s) is shaped. The system processes the bulk materials to shape the bulk material into the respective component(s) of the vacuum cell.

At 515, the system determines whether the bulk material(s) (e.g., any of the shaped components) is to be pre-processed. Examples of pre-processing include polishing a surface finish, creating an anti-reflective meta structure, applying an anti-reflective coating, cleaning, etc. For example, the system determines whether the substrates on any component to be conformally coated are to be textured or surface engineered (e.g., to create meta structures such as for forming gradient anti-reflective meta surfaces). In response to determining that the bulk material(s) is to be pre-processed (e.g., processed before applying the conformal coating), process 500 proceeds to 520. Conversely, in response to determining that the bulk materials are not to be pre-processed, process proceeds to 525.

At 520, the bulk material(s) are correspondingly pre-processed. The pre-processing of the bulk material(s) may include cleaning, polishing, texturing, etc. the bulk material(s) or otherwise preparing the target substrates for application (e.g., deposition) of the conformal coating.

At 525, the bulk material(s) are assembled. In some embodiments, the bulk materials are assembled to a maximum extent possible (or close to the maximum extent possible) while still allowing the conformal coating to be applied. As an example, in the case of an ALD conformal coating process, the bulk materials are assembled to form the vacuum cell comprising one or more introducer openings (e.g., apertures) via which the vapor may enter the vacuum cell to coat surfaces within the vacuum cell (e.g., the inner wall of an inner vacuum chamber(s)). The assembly of the bulk material(s) to obtain the vacuum cell may include welding or bonding various components together.

Although process 500 illustrates the assembly of the bulk material(s) being performed after the determination of whether pre-processing is to be performed (e.g., 525 is performed after 515), according to various embodiments, the bulk material(s) (e.g., the vacuum cell) is substantially assembled (e.g., to an extent required for by the conformal coating process) before the bulk material(s) (e.g., surfaces of target substrates) is pre-processed.

At 530, the vacuum cell is provided. The vacuum cell (e.g., an unsealed and mostly assembled vacuum cell) is provided to the service or process that invoked process 500, such as to 410 of process 400.

At 535, a determination is made as to whether process 500 is complete. In some embodiments, process 500 is determined to be complete in response to a determination that no further assembly of the vacuum cell is required (e.g., to obtain a mostly assembled vacuum cell ready for the conformal coating application), no further vacuum cells are to be processed, a user has exited the system, or otherwise indicates that process 500 is to be paused or stopped, etc. In response to a determination that process 500 is complete, process 500 ends. In response to a determination that process 500 is not complete, process 500 returns to 505.

Figure 6:
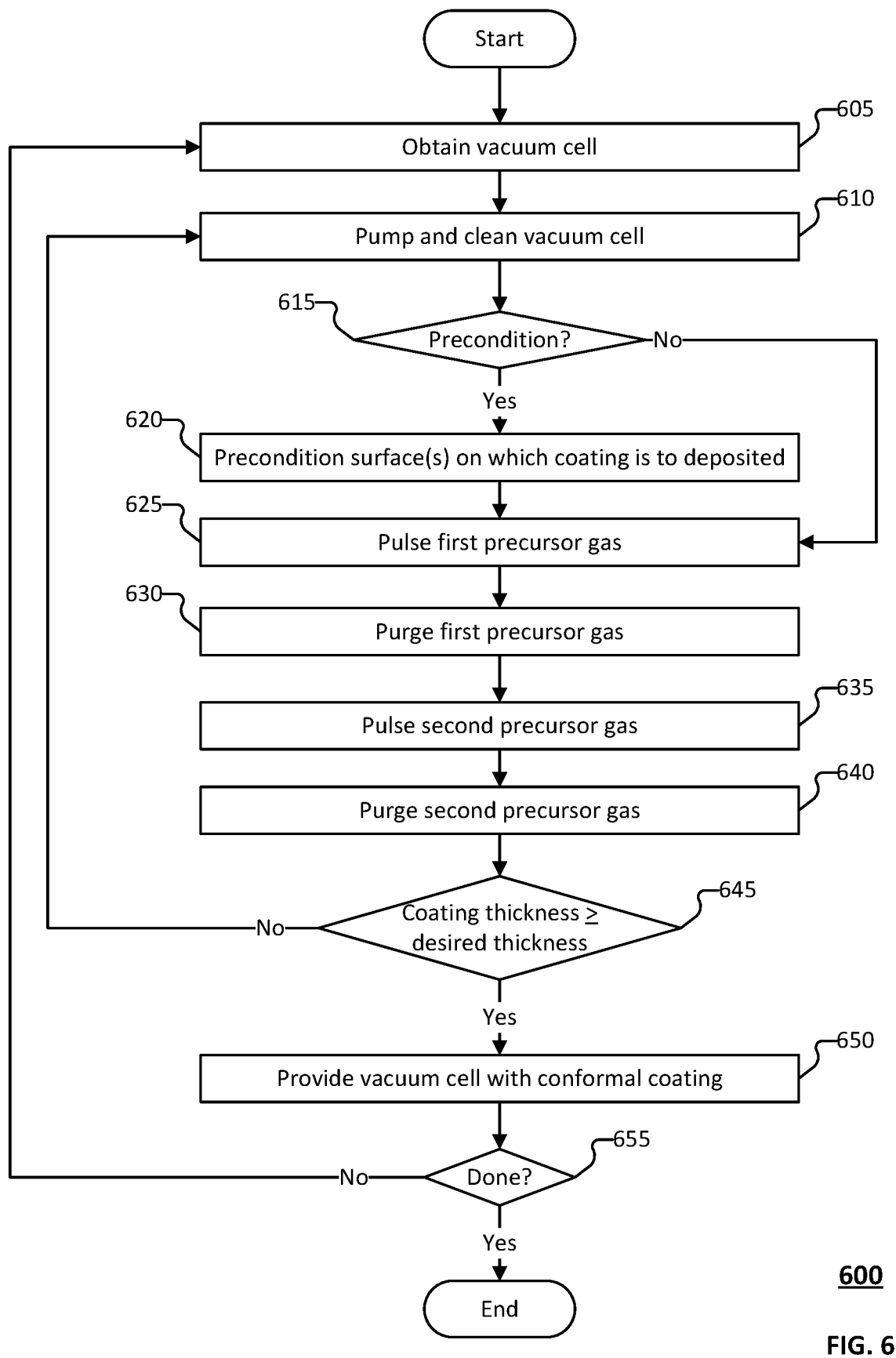
FIG. 6 is a flow diagram of a process for providing a conformal coating on a vacuum cell according to various embodiments of the present application.

FIG. 6 is a flow diagram of a process for providing a conformal coating on a vacuum cell according to various embodiments of the present application. In some embodiments, process 600 is invoked by process 600, such as at 415 of process 400.

In some embodiments, the ALD coating technique and other similar vapor deposition techniques includes precise control over a coating thickness. In the case of ALD, each layer is deposited at an atom-by-atom basis. Thus, the conformal coating can be gradually built up to achieve the desired thickness. Achieving the desired thickness includes iteratively pumping and introducing the ALD precursor until the desired thickness is obtained. In some embodiments, the desired thickness is at least 50 nm. In some embodiments, the desired thickness is at least 100 nm.

Target substrates and structures to be conformally coated can be glasses, semiconductors, metals, graphite, polymers. The target substrates may be formed by subtractive machining, additive machining, etching, melt or glass draw processes, semiconductor processes, MEMS processes, etc. A precursor may be enabled through one or more of (i) first oxidizing or nitrating metals or semiconductors, (ii) diffusing materials into or out of glasses, or (iii) ion replacement. The surface activations may include radiation, UV, ion million, electron milling, ashing, plasma activation, plasma etching, deep reactive ion etching (DRIE), magneton sputtering, ion beam sputtering, thermal evaporation, wet etching, wet chemical processing, detergent soaks, acid or base baths, ultra-high vacuum baking, vacuum firing, etc. Various other surface activations may be implemented.

At 605, a vacuum cell is obtained. For example, the vacuum cell assembled provided at 530 of process 500 is obtained. The vacuum cell may be substantially assembled (e.g., to a maximum extent possible while still permitting access for the ALD coating).

At 610, the vacuum cell is cleaned and pumped. The system further prepares the surface(s) for coating. For example, the target substrate on which the thin film will be deposited is cleaned thoroughly to remove any contaminants or oxide layers. This is usually done using standard cleaning techniques such as ultrasonication, solvent cleaning, or plasma treatment. Before starting the ALD deposition process, the cleaned target substrate is loaded into the ALD reactor chamber, which is typically a vacuum or low-pressure environment.

At 615, the system determines whether a pre-condition surface is to be processed. For example, the system determines whether the target substrate on which the layer is to be deposited is to be prepared for coating. In response to determining that the surface is to be pre-conditioned, process 600 proceeds to 620. Conversely, in response to determining that pre-conditioning the surface is not required, process 600 proceeds to 625.

At 620, the surface(s) on which the conformal coating is to be deposited is preconditioned. Before the deposition cycles begin (or with each iteration of the deposition cycle), the substrate may undergo a preconditioning step. This step involves exposing the substrate to a specific gas or gas mixture to prepare the surface for the subsequent deposition process. The preconditioning step helps in achieving better film quality and adhesion.

At 625, a first precursor gas is pulsed. The first precursor gas is introduced into the reactor chamber. This precursor gas reacts with the surface of the substrate, forming a monolayer of the desired material. The exposure time is typically kept short to ensure a self-limiting reaction, where only a single layer is formed.

At 630, the first precursor gas is purged. After the pulse of the first precursor gas, the reactor chamber is purged with an inert gas, such as nitrogen or argon, to remove any excess precursor and reaction by-products. The purging step is crucial to prevent unwanted reactions in subsequent cycles and ensure a clean surface for the next precursor.

At 635, a second precursor gas is pulsed. The second precursor gas is introduced into the reactor chamber. It reacts with the surface, complementing the first precursor and forming another atomic layer on top. Similar to the pulsing of the first precursor gas, the exposure time is kept short to ensure self-limiting reactions.

At 640, the second precursor gas is purged. Similar to 630, the chamber is purged again to remove excess precursor and reaction by-products.

At 645, the system determines whether the conformal coating thickness is the desired thickness, such as whether the conformal coating thickness is greater than or equal to the desired thickness). In response to determining that the desired thickness has not yet been attained, process 600 returns to 610 and process 600 iterates over 610-645 until the desired thickness is attained. In response to determining that the conformal thickness satisfies the desired thickness (e.g., that the conformal coating thickness is greater than or equal to the desired thickness), process 600 proceeds to 650.

In some embodiments, 625-640 are repeated for each additional precursor required to build the desired film (e.g., conformal coating). The number of cycles depends on the desired film thickness and composition. During an iteration/cycle of the deposition process, the system may deposit a material different from the previously deposited material.

At 650, the vacuum cell with the conformal coating is provided. In some embodiments, the vacuum cell having the conformal coating is provided to the service or process that invoked process 600, such as 415 of process 400. In some embodiments, the system performs an optional post-treatment. After the desired number of cycles, a post-treatment step may be performed to modify the film's properties further. This can involve annealing, plasma treatment, or exposure to other reactive gases. After the coating is deposited or optional post-treatment, the vacuum cell is removed from the ALD reactor chamber.

At 655, a determination is made as to whether process 600 is complete. In some embodiments, process 600 is determined to be complete in response to a determination that no further coatings are to be deposited, no further vacuum cells are to be processed, a user has exited the system, or otherwise indicates that process 600 is to be paused or stopped, etc. In response to a determination that process 600 is complete, process 600 ends. In response to a determination that process 600 is not complete, process 600 returns to 605.

These steps outline a general sequence for atomic layer deposition. However, variations in the process may exist depending on the specific ALD system, precursor materials, and desired film properties.

Figure 7:
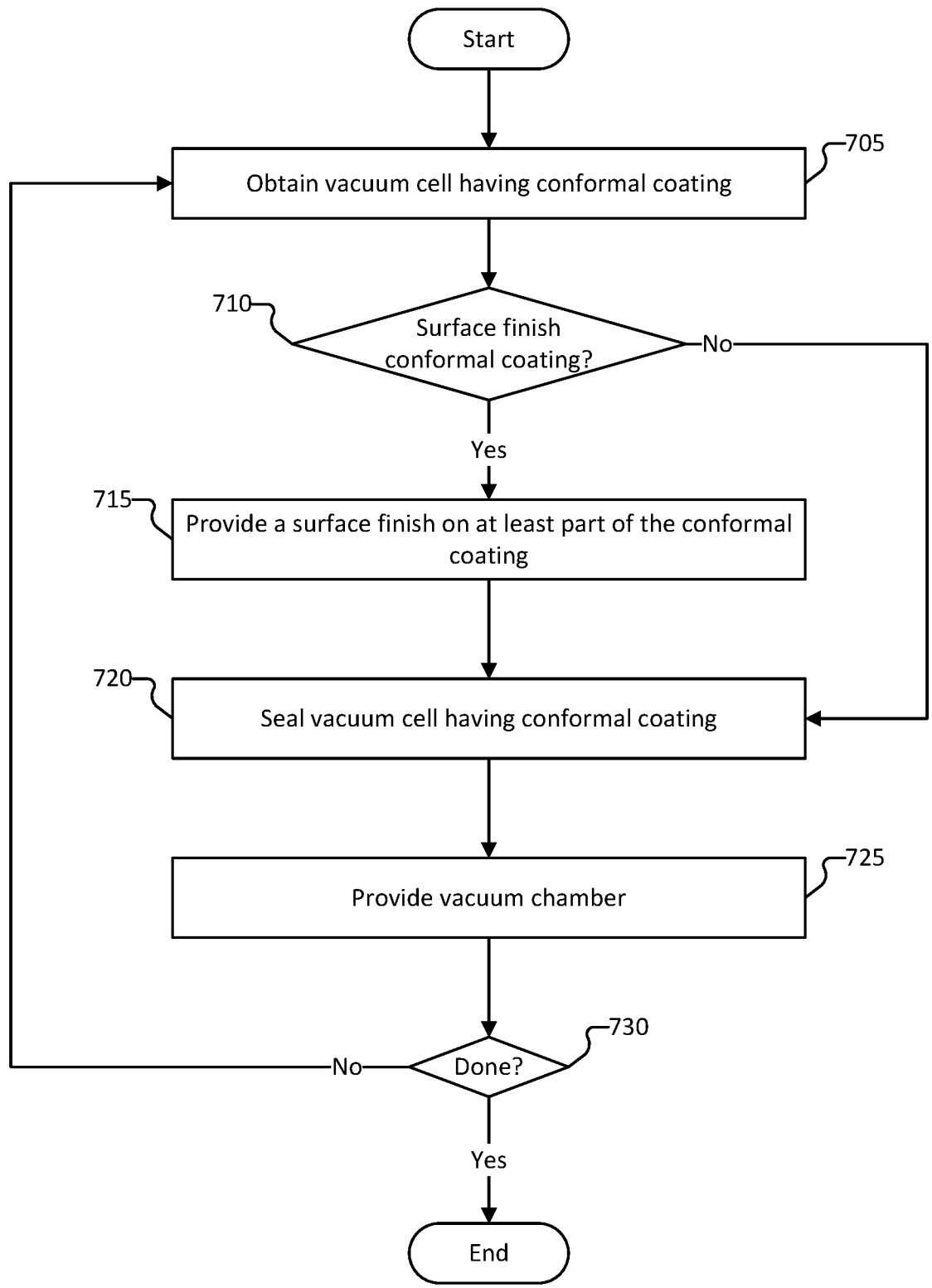
FIG. 7 is a flow diagram of a process for post-processing a vacuum cell having a conformal coating according to various embodiments of the present application.

FIG. 7 is a flow diagram of a process for post-processing a vacuum cell having a conformal coating according to various embodiments of the present application. In some embodiments, process 700 is invoked by process 400, such as at 420.

At 705, a vacuum cell having a conformal coating is obtained.

At 710, the system determines whether to surface finish the conformal coating (or otherwise post-process the vacuum cell. In response to determining that the conformal coating is to be surface finished at 710, process 700 proceeds to 715. Conversely, in response to determining that the conformal coating is not to be surface finished, process 700 proceeds to 720.

At 715, a surface finish is provided on at least part of the conformal coating (or at least a part of the conformal coating is post-processed). In some embodiments, the conformal coating is post-processed to create meta structures on the surface thereof. For example, the conformal coating is post-processed to exhibit surface properties, such as to cause the conformal coating to act as a diffractive grating, an anti-reflective surface, etc. The post-processing of the conformal coating includes forming grooves or other geometries in the conformal coating. The post-processing may be performed using an ultrafast laser for texturing, subtractive machining, additive machining, etching, melt or glass draw processes, semiconductor processes, or micro-electromechanical systems (MEMS) processes. As an example, an ultrafast laser may be used to ablate the surface of the conformal coating to create a meta surface. Meta surfacing may be performed by flowing, molding, stamping, machining, or etching the coating (e.g., the conformal coating). Meta surfacing may include growing, etching, or otherwise forming subwavelength structures, such as to diffract light passing through or to function as a lens).

At 720, the vacuum cell having the conformal coating is sealed. For example, the introducer openings (e.g., apertures) via which the vapor entered the vacuum cell to conformally coat the vacuum cell (e.g., the internal vacuum chamber(s)) are sealed.

At 725, the vacuum chamber is provided. For example, the vacuum chamber is provided to the process/service that invoked process 700.

At 730, a determination is made as to whether process 700 is complete. In some embodiments, process 700 is determined to be complete in response to a determination that no further coatings are to be deposited, no further vacuum cells are to be processed, a user has exited the system, or otherwise indicates that process 700 is to be paused or stopped, etc. In response to a determination that process 700 is complete, process 700 ends. In response to a determination that process 700 is not complete, process 700 returns to 705.

Figure 8:
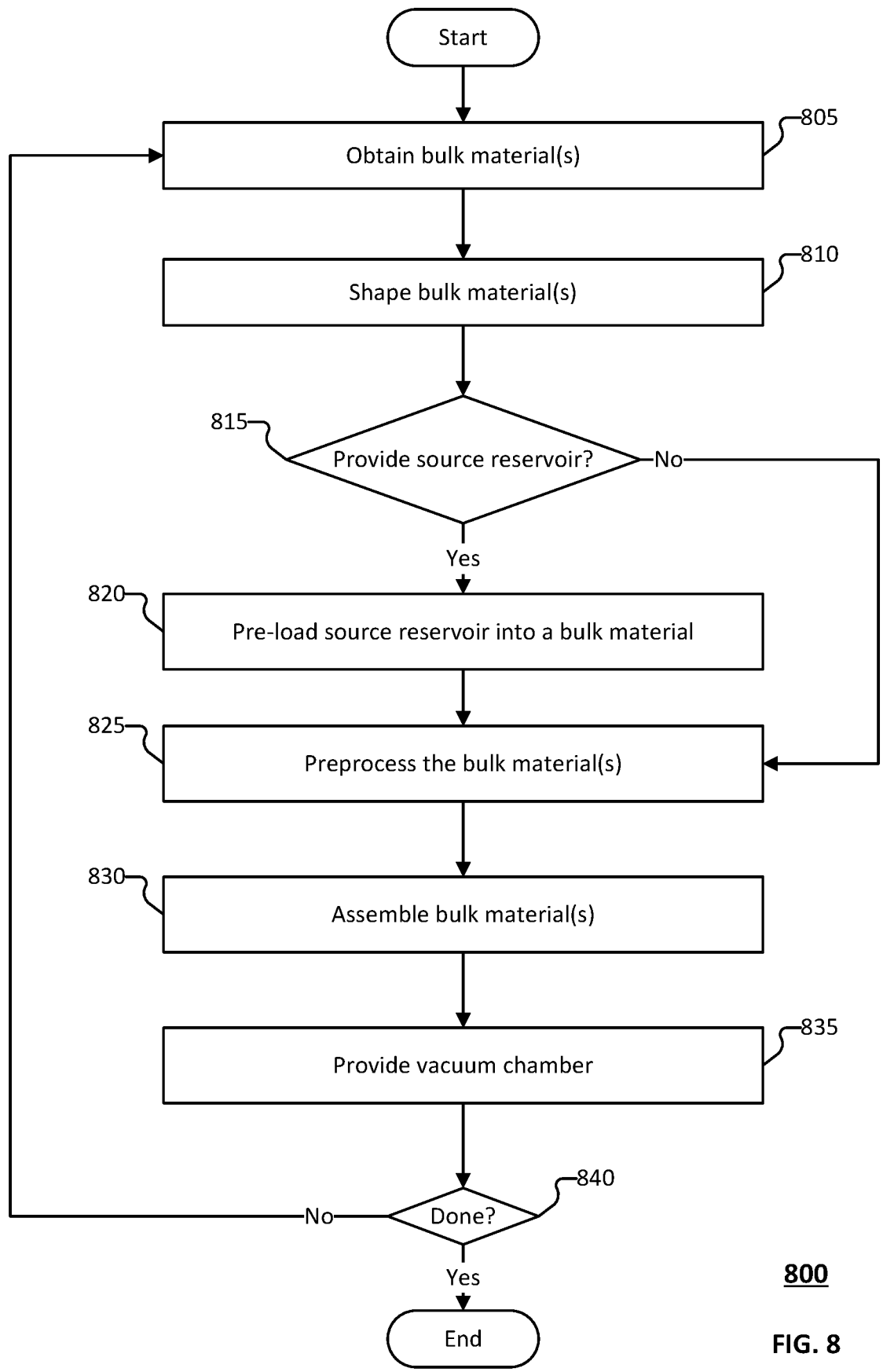
FIG. 8 is a flow diagram of a process for providing a vacuum cell having a conformal coating according to various embodiments of the present application.

FIG. 8 is a flow diagram of a process for providing a vacuum cell having a conformal coating according to various embodiments of the present application. In some embodiments, process 800 is invoked by process 400, such as at 410.

In some embodiments, vacuum cells comprise a source reservoir. The source reservoir may be stored in a bulk material, such as a component of the vacuum cell forming a wall (e.g., a wall in the inner vacuum chamber). The coating techniques described herein may be used to hold the source species of the source reservoir in the bulk material until such time that the source species are selected to be released into the vacuum cell. For example, a source species may be pre-loaded into a bulk material forming a part of the vacuum cell and a conformal coating may be applied to the surface(s) of the bulk material to trap the source species within the bulk material (e.g., in the source reservoir). The system may selectively control the release source species, such as by breaking the conformal coating. such as by laser ablation, laser melting, thermal expansion (e.g., to form a crack in the coating), a chemical reaction, etching, etc.

In some embodiments, conformal coatings are applied to structures comprising sorbed, intercalated, allowed, bonded, or macroscopically contained quantities of a source species. The source species may be a volatile, sensitive, reactive, or valuable material. Examples of the source species include an alkali metal, an alkaline earth metal, or other elements or molecules. The coating seals the source species to enable handling, processing, or exposure to deleterious environments and conditions such as oxidation, heating, reaction, etc. The source species may be accessed substantially on demand by cracking, introducing a defect to, or otherwise removing the coating. The structures comprising a source reservoir sealed therein may be incorporated into various vacuum packages, assemblies, subassemblies, or provided individually as alkali or other substance source components.

An example of a source reservoir is bulk carbon loaded with an alkali and coated with the conformal coating to keep the alkali within the bulk carbon until needed/desired.

Process 800 is described in connection with a bulk material shaped into the vacuum cell or component thereof as being configured to comprise a source reservoir. However, a similar process may be implemented to prepare a standalone structure comprising a source reservoir.

At 805, a bulk material(s) is obtained. At 810, the bulk material(s) is shaped. At 815, the system determines whether a source reservoir is to be provided. For example, the system determines whether the bulk material(s) is to be loaded with a source species for a controlled or delayed release (e.g., to load the bulk material for retrieval by the control system of the vacuum cell on demand). In response to determining that the source reservoir is to be provided, process 800 proceeds to 820. Conversely, in response to determining that a source reservoir is not to be provided (e.g., to the vacuum cell), process 800 proceeds to 825. At 820, the source reservoir is pre-loaded into the bulk material(s). The bulk material(s) may be pre-loaded by causing a sorption (e.g., adsorption or absorption) of a selected source species into the bulk material. At 825, the bulk material(s) are pre-processed. Although process 800 illustrates 825 being performed after 820, 825 may be implemented before 820, such as before 815. At 830, the bulk material(s) are assembled. Although process 800 illustrates 830 being performed after 825, 825 may be implemented before 825 or alternatively before 820, such as before 815. At 835, the vacuum chamber is provided. For example, the vacuum chamber is provided to the process/service that invoked process 800. The vacuum chamber may be provided to the process that controls the forming of a conformal layer, such as to serve as a barrier to prevent the source species to be released from the source reservoir (e.g., from the bulk material that has been pre-loaded with the source species) until required.

At 840, a determination is made as to whether process 800 is complete. In some embodiments, process 800 is determined to be complete in response to a determination that no further source reservoirs are to be created, no further vacuum cells are to be processed, a user has exited the system, or otherwise indicates that process 800 is to be paused or stopped, etc. In response to a determination that process 800 is complete, process 800 ends. In response to a determination that process 800 is not complete, process 800 returns to 805.

The source reservoir may function as an on-demand source of source species. The system may selectively cause the source species to be released (e.g., within the inner vacuum chamber) by the removal or damage of the seal (e.g., the conformal coating). The system may cause the source species to be released by locally cracking, ablating, intercalating, diffusing, electrically pulling, exciting, or otherwise breaking the seal via direct or indirect means. For example, the seal may be removed/damaged with a laser ablation, a laser melting, a thermal expansion (e.g., causing the coating and substrate to be heated), causing a chemical reaction with the conformal coating material, etching the conformal coating, etc.

Figure 9:
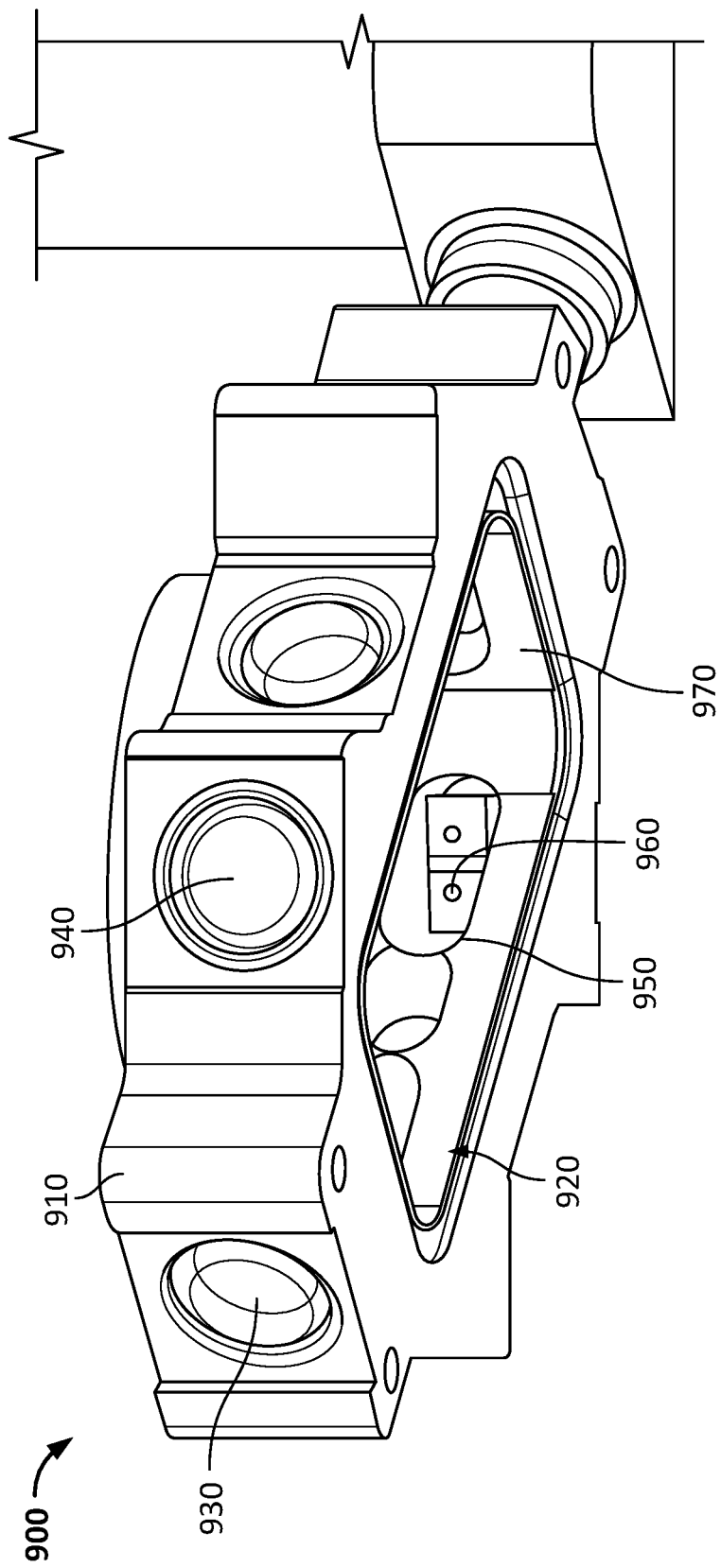
FIG. 9 is a diagram of an atomic-based vacuum system according to various embodiments of the present application.

FIG. 9 is a diagram of an atomic-based vacuum system according to various embodiments of the present application. In the example shown, vacuum cell 900 comprises outer wall(s) 910 and inner cavity 920. Vacuum cell 900 further comprises windows 930, 940 via which the system interrogates the atomic source and/or monitors or measures the atomic interactions within inner cavity 920. The atomic source is loaded to the vacuum cell. For example, target holder 950 is loaded to vacuum cell 900 in a manner in which aperture 960 faces internal cavity 920. The atomic source loaded to target holder 950 may be interrogated by an activation system via aperture 960.

In some embodiments, the bulk material forming wall 970 may be configured with a source reservoir. During manufacture of the vacuum cell, a source species is pre-loaded into the structure (e.g., the bulk material), such as via sorption. The bulk material and source species (or source material) may be selected to absorb or adsorb the source species. Thereafter, a conformal coating is applied to seal the source into the bulk material. The bulk material may be used as wall 970 of vacuum cell 900. The source material sealed within the bulk material of wall 970 may be selectively released by breaking the conformal coating, such as by ablating the conformal coating using a laser transmitted through window 930.

The conformal coating techniques described herein may be used in various vacuum cells deployed in a wide variety of quantum applications, such as in quantum information processing, quantum memory, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a vacuum cell having at least one internal vacuum chamber, the vacuum cell being formed of at least one piece; and
 a conformal coating on the at least one internal vacuum chamber, the conformal coating having fewer seams than a number of the at least one piece.

2. The system of claim 1, wherein the conformal coating has one seam.

3. The system of claim 1, wherein the cell includes multiple materials.

4. The system of claim 3, wherein the conformal coating is deposited on the multiple materials in a continuous manner across at least two of the multiple materials.

5. The system of claim 3, wherein:
 the multiple materials include a dielectric material and a metal; or
 the multiple materials include at least two of a dielectric, semiconductor, or crystalline material.

6. The system of claim 1, wherein the conformal coating has a thickness of at least 50 nm.

7. The system of claim 1, wherein the conformal coating has a thickness of 100 nm.

8. The system of claim 1, wherein the vacuum cell has a cell volume of at least 1 cc.

9. The system of claim 1, wherein the system comprises one or more incident lasers and optics that are configured to trap or push atoms within the vacuum cell, or to interrogate or modify a quantum or electronic state of the atom or molecule.

10. The system of claim 1, wherein the vacuum cell comprises one or more of a getter, a dispenser, and an ion pump.

11. The system of claim 1, wherein the vacuum cell corresponds to at least one of: an ultra-high vacuum cell, a channel cell, and a conflat-based cell.

12. The system of claim 1, wherein the vacuum cell is a vapor cell.

13. The system of claim 1, wherein the vacuum cell is free of a vapor chamber for a vapor source.

14. The system of claim 1, wherein the at least one internal vacuum chamber includes multiple chambers having fluidic connections therebetween.

15. The system of claim 1, wherein the conformal coating is an alkali barrier.

16. The system of claim 1, wherein the conformal coating is a barrier to helium diffusion.

17. The system of claim 1, wherein the conformal coating is an outgassing barrier.

18. The system of claim 1, wherein the vacuum cell is a glass cell, a metallic cell, or a semiconductor cell.

19. The system of claim 1, wherein the conformal coating is an atomic layer deposition (ALD) coating.

20. The system of claim 1, wherein the conformal coating comprises one or more of a sapphire, a graphene a carbide, and a nitride.

21. The system of claim 1, wherein the vacuum cell comprises an additional coating.

22. The system of claim 21, wherein the additional coating is an adhesion layer, or an anti-reflective coating.

23. The system of claim 1, wherein a surface of the internal vacuum chamber has one or more structures formed thereon.

24. The system of claim 1, wherein a surface of the conformal coating comprises one or more structures formed thereon.

25. The system of claim 1, wherein the system comprises an outer conformal coating on at least one outer wall of the vacuum cell.

26. The system of claim 1, wherein the system comprises a sensor, a quantum repeater, or a quantum computer.

27. The system of claim 1, wherein one or more surfaces of the at least one internal vacuum chamber is laser annealed or laser bonded at one or more of the seams in the conformal coating.

28. A method, comprising:
 creating an unsealed vacuum cell having at least one internal vacuum chamber, the vacuum cell being formed of at least one piece;
 pumping the unsealed vacuum cell;
 performing a conformal coating process to deposit a conformal coating on the at least one internal vacuum chamber, the conformal coating having fewer seams than a number of the at least one piece; and
 sealing the unsealed vacuum cell to obtain a sealed vacuum cell.

29. The method of claim 28, wherein the conformal coating process comprises an atomic layer deposition (ALD) process.

30. The method of claim 28, wherein the conformal coating is applied to the majority or entirety of the outside of the cell after the vacuum cell is sealed and singulated.

* * * * *